United States Patent [19]
DeLucia

[11] Patent Number: 6,142,492
[45] Date of Patent: Nov. 7, 2000

[54] WATERCRAFT CARRIER FOR LAND TRANSIT

[75] Inventor: Paul DeLucia, 41 Seneca St., Baldwinsville, N.Y. 13027

[73] Assignee: Paul Delucia, Baldwinsville, N.Y.

[21] Appl. No.: 09/061,456

[22] Filed: Apr. 16, 1998

[51] Int. Cl.[7] .................................................. B62B 1/00
[52] U.S. Cl. ............................ 280/47.331; 280/47.131; 280/659
[58] Field of Search ........................ 280/47.11, 47.131, 280/47.17, 47.24, 47.26, 656, 42, 651, 652, 659, 63, 64, 47.331; 224/400, 401; 135/66, 67

[56] References Cited

U.S. PATENT DOCUMENTS

| | | |
|---|---|---|
| Re. 32,844 | 1/1989 | Horowitz . |
| 1,559,988 | 11/1925 | Ryan .......................................... 280/42 |
| 1,618,065 | 2/1927 | Davis .......................................... 135/67 |
| 2,260,676 | 10/1941 | LaFaye, Sr. . |
| 2,546,726 | 3/1951 | Creamer .............................. 280/47.131 |
| 2,688,494 | 9/1954 | Wilson . |
| 2,818,268 | 12/1957 | Johnson . |
| 2,844,383 | 7/1958 | Deeter . |
| 3,046,034 | 7/1962 | Herrick ................................ 280/47.24 |
| 3,068,021 | 12/1962 | Ulinski . |
| 3,188,108 | 6/1965 | Davis . |
| 3,271,798 | 9/1966 | Zoretic . |
| 3,860,255 | 1/1975 | Rodriguez . |
| 3,986,723 | 10/1976 | Brockelsby . |
| 4,214,774 | 7/1980 | Kluge . |
| 4,215,877 | 8/1980 | Pritchett ................................. 280/652 |
| 4,392,665 | 7/1983 | Miller et al. . |
| 4,422,665 | 12/1983 | Hinnant . |
| 4,601,481 | 7/1986 | Maurice . |
| 4,712,803 | 12/1987 | Garcia . |
| 4,817,975 | 4/1989 | Saraydar ................................... 280/63 |
| 4,824,127 | 4/1989 | Stamm . |
| 4,830,387 | 5/1989 | Batten . |
| 4,936,595 | 6/1990 | Cunningham . |
| 5,020,816 | 6/1991 | Mulholland .......................... 280/250.1 |
| 5,072,959 | 12/1991 | Marullo . |
| 5,096,216 | 3/1992 | McCalla . |
| 5,114,165 | 5/1992 | Vogel . |
| 5,203,580 | 4/1993 | Cunningham . |
| 5,249,823 | 10/1993 | McCoy et al. ........................... 280/656 |
| 5,261,680 | 11/1993 | Freitus et al. . |
| 5,320,371 | 6/1994 | Levad . |
| 5,348,327 | 9/1994 | Gieske . |
| 5,501,169 | 3/1996 | Denker . |
| 5,697,109 | 12/1997 | Hodgetts ................................ 5/81.1 R |
| 5,806,878 | 9/1998 | Mroczka et al. ........................ 280/653 |
| 5,823,146 | 10/1998 | Alaniz et al. ........................... 119/725 |
| 5,887,879 | 3/1999 | Chumley ................................... 280/40 |

FOREIGN PATENT DOCUMENTS 924384   8/1947   France .............................. 280/47.131

*Primary Examiner*—Brian L. Johnson
*Assistant Examiner*—Michael Cuff
*Attorney, Agent, or Firm*—Wall Marjama Bilinski & Burr

[57] ABSTRACT

A watercraft carrier is provided that rollably supports a watercraft for transit to a location on land. The watercraft carrier includes a cradle assembly that has a width adjustable and shape conforming sheet that supports the transported watercraft uniformly and distributing that support laterally along the hull. The cradle assembly also includes width adjustable, opposed, separately pivoting, pliant supports that wedge around the hull and secure the watercraft within the carrier. The cradle assembly fastens a watercraft to the cradle assembly as well with opposed gunwale straps that separately secure each opposing gunwale. The watercraft carrier includes a cradle assembly for supporting and securing a watercraft, a width adjustable frame assembly that detachably supports the cradle assembly, and a wheel assembly that is detachably connected to the frame assembly.

24 Claims, 4 Drawing Sheets

WATERCRAFT CARRIER FOR LAND TRANSIT

BACKGROUND OF THE INVENTION

This invention relates to a watercraft carrier, and more particularly to a wheeled carrier for human propelled portage of a watercraft.

Typically, in cases where a body of water to be accessed is not directly accessible by vehicle, or where several separated bodies of water are to be enjoyed, watercraft enthusiasts, especially canoe enthusiasts, carry (or portage) their watercraft as well as their other gear.

Several wheeled watercraft carriers have been developed to assist watercraft enthusiasts in the portage of their watercraft. It is desirable that a wheeled watercraft carrier be able to negotiate a rough terrain and maintain at the same time a secured watercraft and an undamaged watercraft, be able to accommodate a variety of hull shapes and sizes, be sturdy, be lightweight, be compact, and be simple to use.

Rough terrain affects the ability of a watercraft carrier to maintain a secure and an undamaged watercraft by subjecting the watercraft to high linear and rotational forces as the watercraft carrier encounters rough terrain. Some encountered forces are transferred to the in-contact watercraft surfaces, and are applied both linearly and rotationally to the watercraft. At the same time, the carrier itself is subject to linear and rotational forces that are not imparted to the watercraft, and that accelerate the carrier with reference to the watercraft. The result of these rough terrain forces stresses the watercraft at its in-contact area with the carrier, and acts to loosen the watercraft from, rotate the watercraft within, and translate the watercraft within, the watercraft carrier. The rotation of the watercraft in relation to the carrier may occur as a rolling, a pitching, and a yawing about the carrier. The translation and rotation of the watercraft subjects a watercraft to damage not only from ambient objects, but also from the wheels and frame of the carrier itself.

Prior watercraft carrier inventions have included apparatus that secure a watercraft only vertically or horizontally at specific points, generally frame contact points. These carriers do not distribute the encountered force but concentrate the encountered force at the specific points and their contiguous elements. These carrier inventions accordingly disproportionately stress specific points of the watercraft and risk unnecessary damage at these points specifically and to the watercraft generally, and limit the weight of the watercraft and the weight that can be portaged within the watercraft. Moreover, these carriers provide no lateral securing force to the watercraft, and accordingly allow the watercraft to laterally loosen from their hold, allowing both a pitch and a yaw of the watercraft within the carrier.

Prior watercraft carrier inventions have also included apparatus that secure a watercraft downward against the carrier, without securing each side individually. These carriers provide no deterrence against a watercraft rolling about its lateral axis within the carrier and consequently assuming an unaligned position within the carrier. A primary example of a downward securing apparatus is a strap connected from one carrier side to the other over the top of the watercraft. A single strap over the top of the watercraft not only provides minimal deterrence to a rolling of the watercraft within the carrier, but may also crush the watercraft as the straps are over-tightened to secure the watercraft, particularly in the case of an ultra-light hulled watercraft.

Prior watercraft carrier inventions moreover have unnecessarily wide wheel width to compensate for their tendency to allow a watercraft to shift, especially in rough terrain, and contact the wheel assembly. These carriers insure that the carrier and the watercraft will not make contact by unnecessarily widening the width between the wheel assemblies.

Prior watercraft carrier inventions have additionally included apparatus that have a fixed shape and dimension, and also apparatus substantially consisting of rigid elements that are accordingly not very collapsible or compact. A fixed shape and dimension carrier generally accommodates a single corresponding fixed shape and dimension watercraft only. A non-collapsible and non-compact watercraft is bulky and impractical to store within a watercraft and a vehicle.

OBJECTS AND SUMMARY OF THE INVENTION

This patent describes a watercraft carrier that allows outdoor enthusiasts to transportably wheel a canoe or other watercraft with their gear in a single trip over rough terrain, with minimal risk of damage to the watercraft hull.

One of the desired objects of the watercraft carrier of this invention is to support a watercraft uniformly, and to distribute that support laterally along the hull, so that a small area of the watercraft does not support the forces inherent in a portage, and accordingly is not damaged by these forces.

Another of the desired objects of the watercraft carrier of this invention is to support a watercraft laterally and secure a watercraft against linear and rotational forces, so that the watercraft is not damage during a portage and does not have to be re-secured and re-aligned within the carrier during that portage.

Yet another of the desired objects of the watercraft carrier of this invention is to secure a watercraft in a fixed position relative to its wheels and accordingly have a wheel width that is not unnecessarily wide to compensate for an unsecured watercraft injuriously contacting the wheel assembly.

Yet still another of the desired objects of the watercraft carrier of this invention is to conform its shape to a wide variety of watercraft hull shapes, so that it may optimally secure and support a wide range of watercraft hull shapes and dimensions.

And still another of the desired objects of the watercraft carrier of this invention is to be more fully both collapsible and separable so that it may be stored compactly both within the watercraft and within a transporting vehicle.

Briefly stated, the watercraft carrier of this invention rollably supports a watercraft for transit to a location on land. The watercraft carrier includes a width adjustable cradle assembly that supports the transported watercraft uniformly and distributes that support laterally along the hull. The cradle assembly also secures the watercraft laterally between width adjusting, opposed and separately pivoting, cradle supports that wedge the opposed hulls of the watercraft within the cradle assembly. The cradle assembly fastens a watercraft to the cradle assembly with opposed gunwale straps that separately secure each opposing gunwale and consequently oppose a rolling motion of the watercraft within the watercraft carrier. The watercraft carrier includes a wheel assembly, and a width adjustable frame assembly that detachably supports the cradle assembly, and detachably supports the wheel assembly.

According to an embodiment of the invention, a cart for use in transporting a watercraft having a hull and opposed gunwales includes a width adjustable frame, a cradle assembly, and a wheel assembly. The frame assembly has an axle for accommodating and securing two rotating wheels, and a support that pivotally secures a hull cradle assembly about the vertical axis. The cart further includes two rotating wheels detachably secured to the axle, and a hull cradle assembly detachably mounted on the support. The hull cradle assembly is width adjustable by virtue of its mounting on the width adjustable frame. The hull assembly includes a pliant sheet that supports the watercraft and that is continuously connected at its lateral sides to opposed lateral supports. The lateral supports individual pivot about the frame assembly in a plane approximately parallel to the watercraft gunwales and secure a supported watercraft by wedging the watercraft hull.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
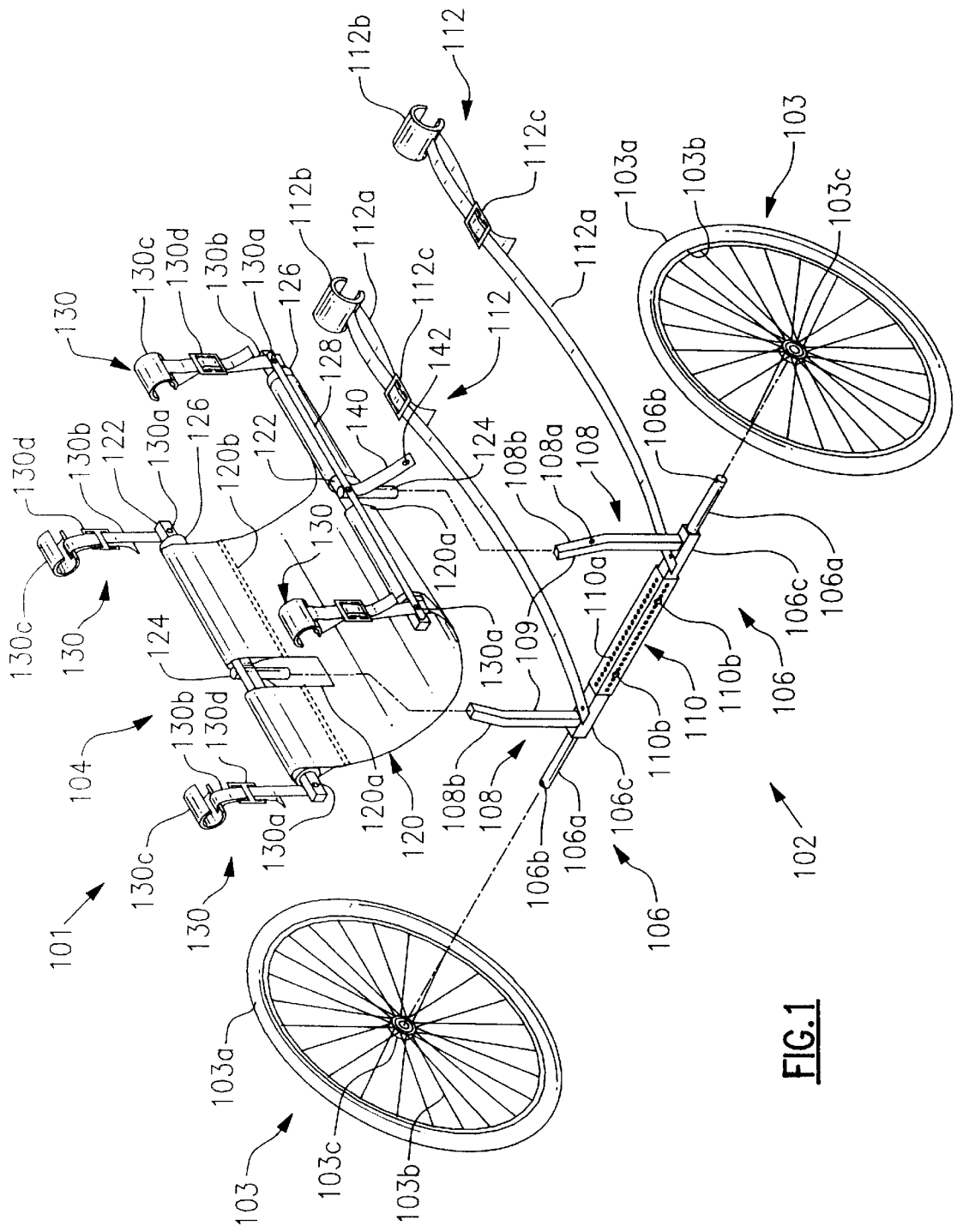
FIG. 1 portrays a perspective view of the water carrier of the invention a "T" shaped cradle support, with the frame, the wheel assemblies, and the cradle assembly exploded in relation to each other.

Referring to FIG. 1, a watercraft carrier 101 of the invention includes a frame 102 that removably supports both a pair of wheel assemblies 103 and a cradle assembly 104.

The watercraft carrier of the invention includes a cradle assembly 104 having an adjustable width for securing a range of varying watercraft hull widths. In the preferred embodiment, the cradle assembly 104 width is varied by adjusting the width of the frame 102 as presently disclosed. An adjustable frame 102 width assures that a hull accommodated by the cradle assembly 104 shall also be accommodated by the wheel assemblies 103, and as well as be properly balanced by the watercraft carrier of the invention.

The frame 102 has a pair of axle assemblies 106; each comprising a round axle 106a sized to removably accommodate the bearings 103c of the wheel assembly 103, and including a stop 106b for a wheel assembly 103, preferably a throughhole accommodated by a locking pin (not shown); an outer axle tube 106c that conventionally both rigidly and removably attaches to the round axle 106a, preferably by means of a bolt; and a down tube 108 that pivotally supports the cradle assembly 104. Each outer axle tube 106c conventionally both rigidly and removably attaches to a separate end of a center tube 110.

The down tubes 108 in the preferred embodiment attach to the cradle assembly 104 by gravity under normal conditions. However, if it becomes necessary to lift an accommodated watercraft, the cradle assembly 104 might separate from the down tubes 108. The down tubes 108 therefor each have a snap 108a for removably mating with a lift strap 140 of the cradle assembly 104 (shown on only one lateral side of the cradle assembly), the lift strap having a snap enclosure 142 corresponding to the snap 108a of the down tubes 108. The lift strap need only be strong enough to support the weight of the wheel assembly 103 and the frame 102. The preferred embodiment down tube 108 additionally has an inward bend 108b in its top portion to move the down tube 108 away from a transported watercraft hull while maintaining a position below a pivot shaft 124 of the cradle assembly 104, to be disclosed presently.

The frame 102 has additionally a pair of lateral straps 112 for pulling the watercraft carrier 101 toward the wider part of a hull. The lateral straps are preferably connected to the watercraft carrier 101 near the outer ends of the frame 102, and each include a strap 112a, a fastener 112b at the far end for removably fastening the strap 112a to a seat, a handle, a thwart, or any other suitable object of the watercraft, and a length adjuster 112c such as a buckle for adjusting the length of the strap, and consequently tightening the lateral strap 112 between the watercraft carrier 101 and the watercraft. The frame 102 can additionally include another pair of lateral straps 112 for attaching the lateral straps 112 to each end of the hull, when the secured hull portion is parallel, for rough usage, and or when the watercraft is pushed backwards.

In the preferred embodiment of this invention, the center tube 110 includes a finite number of closely spaced through holes 110a, sized to accommodate a center tube bolt 110b (or a pin or other removable device for easy width adjustment). Each outer axle tube 106c includes a through hole (not shown) that accommodates a center tube bolt 110b. Each outer axle tube 106c preferably telescopes into a separate end of the center tube 110 and attaches to the center tube by a center tube bolt 110b fastener inserted through the through holes of the center tube 110 and the outer axle tube 106c. The width of both the cradle assembly 104 and of the wheel 103b track is varied by an adjustment of the extent of outer axle tube translation within the center tube 110 so that the outer axle tube through hole lines-up with a center tube through hole 110a.

Referring again to FIG. 1, a wheel assembly 103 includes preferably a pneumatic tire 103a supported by a spoked wheel 103b, and bearings 103c for mounting the wheel assembly 103 on the axle 106a.

The cradle assembly 104 has a pliant sheet 120 for supporting a transported watercraft, that is attached to a cradle bar 122 at each lateral end of the pliant sheet 120. Each cradle bar 122 is attached to a pivot shaft 124. Each pivot shaft 124 removably and pivotally mounts on a down tube 108 by inserting into that down tube 108, each down tube 108 forming hull cradle supporting means 109, whereby the cradle assembly 104 removably attaches to the frame 102.

There are several ways to suspend the pliant sheet 120 of the present invention. What is important is that the pliant sheet 120 be evenly supported along the sides of the watercraft hull. In the embodiment presented herein, the pliant sheet is suspended by two horizontal cradle bars 122, that pivot and therefore secure the watercraft by wedging the watercraft hull. The cradle assembly 104 can be supported from above and from below. The preferred embodiment is pivotally supported from below by the down tubes 108.

The cradle bars 122 are opposed to one another. As shall be presently described, the cradle bars 122 function to laterally secure a watercraft within the cradle assembly 104, functioning as lateral supports. The frame width adjusting means, described hereinbefore, adjusts the width of the frame 102. In assembly, the pivot shafts 124 are attached to the down tubes 108, and accordingly translate longitudinally as the width of the frame 102 is varied. The cradle bars 122 translate as the pivot shafts 124 translate, so that the width, or longitudinal separation distance, between the cradle bars 122 varies with the width of the frame 102. As the width between the cradle bars 122 increases or decreases, the pliant sheet 120 straightens or droops.

The pliant sheet 120 receives and supports a transported watercraft. The pliant sheet 120 is preferably fabricated of a strong nylon canvass. The pliant sheet 120, because it is shape conforming, conforms to an infinite number of hull shapes, both longitudinally across the hull, and laterally along the hull. The support of the hull is distributed horizontally and vertically between the area of the in-contact hull surface and the corresponding in-contact pliant sheet 120 area. Because the support of the watercraft is distributed over the hull surface, and not localized on the hull surface as with prior art watercraft carriers, the watercraft carrier 101 of this invention carries and supports a maximum amount of weight without damaging a watercraft. The shape conforming pliant sheet 120 greatly reduces the weight of the watercraft carrier 101 compared with prior art watercraft carriers having rigid support systems.

The pliant sheet 120 in assembly envelopes each cradle bar 122 by means of a sewn hem forming a loop at each pliant sheet 120 lateral edge. A pliant surface 126 of each cradle bar 122, preferably a foam padding, surrounds each cradle bar 122, the sewn loop enveloping the pliant surface 126. The pliant sheet 120 preferably has a formed void 120a along each pliant sheet 120 lateral side disposed opposite the pivot shaft 124. The preferred embodiment of the cradle assembly 104 includes a metallic strip adjustment bar 128 (shown on only one cradle bar 122) conventionally fastened with standoffs to the outside surface of each cradle bar 122, permitting the pliant sheet 120 to pass between the adjustment bar 128 and the cradle bar 122.

The formed void 120a of the pliant sheet 120, and the adjustment bar 128, together enable an adjustment of the pliant sheet width disposed between the cradle bar—pliant surface combination, by enabling a rolling up or a rolling down of the pliant sheet 120 around the cradle bars 122. A contact between the loop lateral junction 120b (shown on only one lateral side) and the pliant sheet 120 on the one hand, and the adjustment bar 128 on the other hand, acts to stop the loop from spinning freely around the cradle bar 122, and causing the pliant sheet 120 to roll up or down around the cradle bar—pliant surface combination. The formed void 120a enables the pivot shaft 124 to pass through the pliant sheet 120 in its in assembly connection with the down tube 108 when the pliant sheet is in a rolled condition around the cradle bar 122.

The pliant sheet 120 is suspended by the opposed cradle bars 122. The cradle bars 122 support the pliant sheet 120 continuously. Additionally the cradle bars 122, as hereinbefore discussed, in the preferred embodiment each pivot about the down tube 108 in a plane perpendicular to the axis of the down tubes 108 at the point of insertion of the pivot shaft 124. The pivot shaft 124 is positioned on the outside of the cradle assembly 104, to permit the distancing of the down tubes 108 toward the outside of the frame 102. This is especially important for the transport of watercraft having bulging sides, known in the art as a tumblehome. In the preferred embodiment, a vertically disposed lower portion down tube 108 having a 10° bend to the vertical results in the cradle bars rotating in a near horizontal plane.

The cradle bars 122 rotate to accommodate any angle of wedge that the shape of a hull can provide. The transported watercraft rests snugly on the pliant sheet 120, wedged against the cradle bars 122. The pliant surface 126 both cushions the watercraft, providing a softer interface between the cradle bars 122 and the hull; and increases the contact area in comparison with a hard surfaced cradle bar. It is not important that the cradle bars 122 be absolutely parallel to the gunwales, as long as the cradle bars 122 are tight against the sides of the hull. The cradle bars 122 will usually be non-parallel to the gunwales on the vertical plane, depending on the shape of the hull. An increase or a decrease in the hull's angle of wedge will cause a corresponding tilting backward or forward of the carrier with respect to the hull.

The watercraft carrier 101 of this invention preferably secures a transported watercraft hull fore or aft of the watercraft centerline. In the case of a tapered watercraft hull, the separation distance of the cradle bars 122 is adjusted so that when a tapered hull section is placed between the cradle bars, the cradle bars pivot around and wedge the hull between them at a preferred lateral position of the hull, and that the cradle bars 122 both support the watercraft laterally and secure the watercraft within the carrier 101. A non-tapered parallel hull section, such as a canoe hull center, may also be placed within the cradle assembly 104. The cradle bar 122 width is adjusted so that the cradle bars 122 snugly secure a hull between the cradle bars 122. In this application, the carrier 101 may include a total of four lateral straps 112 to attach to both ends of a carrier and to secure a watercraft from sliding laterally along its hull. As long as the cradle bars 122 snugly abut a hull, a rotation of the hull with respect to the frame 102 causes each cradle bar 122 to pivot, consequently reduces the separation distance between the cradle bars 122, and consequently increases the securing force applied by the cradle bars 122 against the watercraft within the cradle assembly 104.

Because the cradle bars 122 laterally secure the watercraft, the frame assembly 102 and wheel assemblies 103 remain in a fixed position relative to the hull. This assures that a transported hull remains secured and aligned within a carrier, and that the hull will not rub against the frame assembly 102 and wheel assemblies 103.

Experimental testing of the preferred embodiment watercraft carrier has shown that when the lower portion of the down tubes 108 are vertical to the ground, a 10° cradle bar 122 angle of rotation with the horizontal results in a proper wedging of tested canoes. It is specifically contemplated that the lower portion of the down tubes 108 may be at a non-vertical angle when a hull is wedged between the cradle bars 122, as well as during a watercraft transport. It is also specifically contemplated in other embodiments of this invention that an angle of rotation about the axles of the watercraft carrier 101 of the invention can be specifically adjusted for an angle of pivot other than one perpendicular to the bottom portion of the down tubes 108, and that the down tube 108 top portion pivot may also have a bend other than 10°. The bend of the down tubes 108 is dependent upon the radius of the bend, the location of the bend on the down tube 108, and the orientation of the down tube 108 relative to the axle.

The watercraft carrier of this invention furthermore includes four separate gunwale securing straps 130, wherein a separate gunwale securing strap 130 is fastened to each end of a cradle bar 122, preferably by a bolt 130a that fastens as well an adjustment bar 128 to a cradle bar 122.

Each gunwale securing strap 130 includes a strap 130b, a gunwale fastener 130c at the far end for removably fastening the strap 130 to a gunwale, and a length adjuster 130d such as a buckle for adjusting the length of the strap, and consequently tightening the securing strap 130 between the cradle bar 122 and the gunwale. The gunwale fastener 130c is preferably a slotted round cylinder that forms a hook, the roundness of the cylinder enclosing any gunwale, and distributing the force between a fastener 130c and a gunwale along the length of the cylinder, while it aligns itself so that only the straps 130b contact the hull. The securing straps 130 each separately hold a single gunwale of the watercraft down from each corner of the cradle assembly 104 into the shape conforming pliant sheet 120, each corner of the cradle assembly 104 independently holding down a contiguous gunwale section, so that the watercraft is prevented from rolling within the pliant sheet 120 during transport, particularly on a rough terrain.

The lateral straps 112 keep the hull wedged into the watercraft carrier 101 by pulling the watercraft carrier 101 towards the wider part of the hull. Because the lateral straps are connected to the carrier near the axle, they also serve to reduce stress (torque) on the carrier and or hull when the wheels run into large obstacles during transport and/or under heavy load.

The preferred embodiment of this invention presented hereinbefore comprises essentially steel alloy support elements. Specifically, the axle assemblies 106, the outer axle tube 106c, the down tube 108, the center tube 110, the cradle bar 122, and the pivot shaft 124 are each preferably an alloy steel material. An alloy steel material provides adequate support for the stresses induced upon the watercraft 101 during a realistic portage through a rough terrain, at a reasonable expense.

Figure 2:
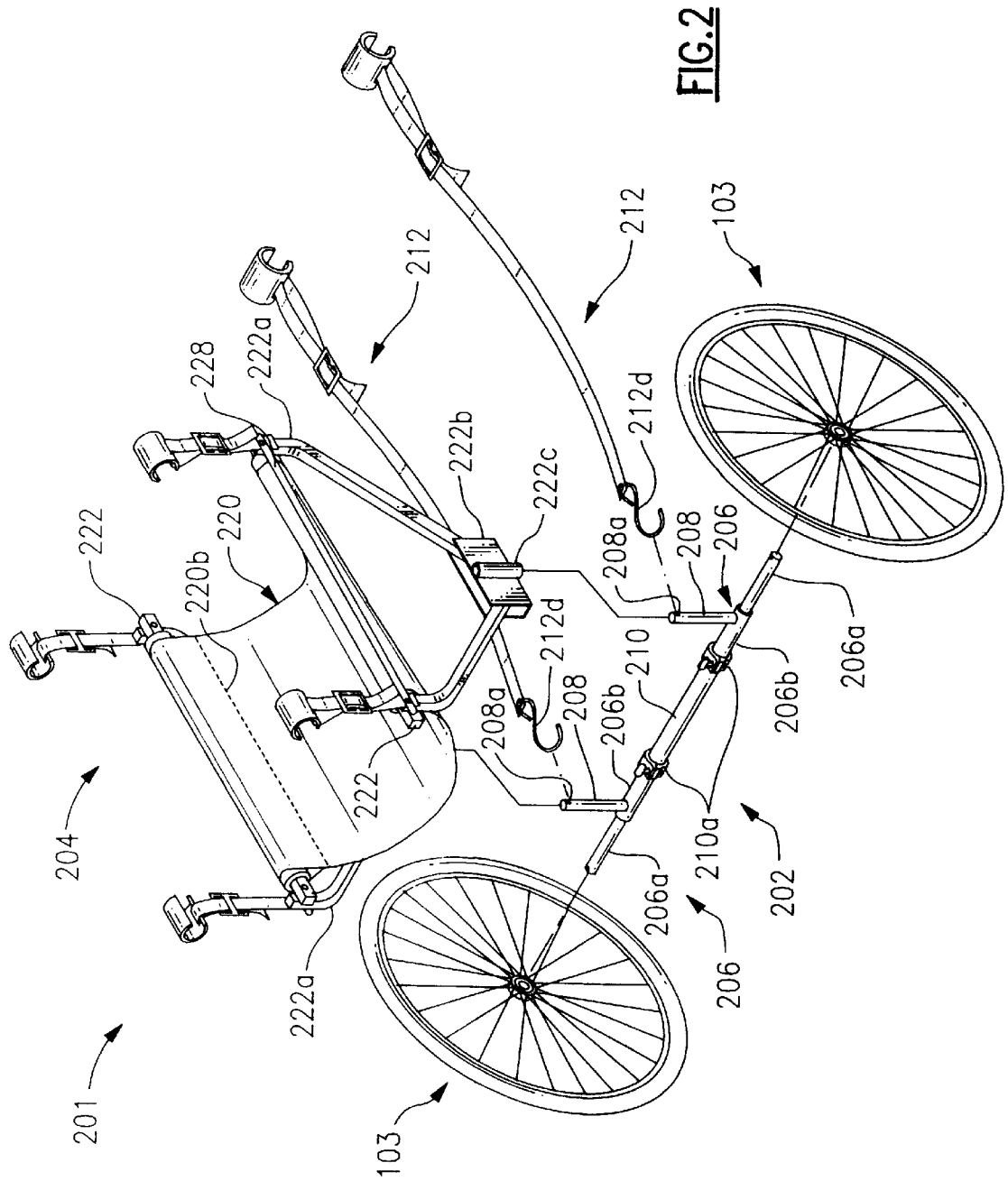
FIG. 2 portrays a perspective view of the water carrier of the invention with a "V"shaped cradle support with the frame, the wheel assemblies, and the cradle assembly exploded in relation to each other.

Referring to FIG. 2, a preferred embodiment of a watercraft carrier 201 of this invention is portrayed that has an alternative individual element design while maintaining the distinguishing characteristics of the watercraft carrier of this invention, including separately pivoting arms, a shape conforming bottom/side surface, and a width adjustable cradle. The embodiment portrayed herein illustrates that various changes and modifications can be made to the carrier without departing from the invention. The carrier herein, because it has a triangular rather than a cantilever design, may be implemented using materials that are not as strong as the materials of the cantilevered carrier portrayed in FIG. 1. The carrier portrayed herein comprises essentially aluminum alloy components. To accommodate the weaker strength of aluminum (or other material) components in comparison with steel components, the watercraft carrier 201 has a structural design that results in key support components supporting smaller forces than a steel embodiment (see 101 of FIG. 1). The watercraft carrier 201 of this invention, in addition to including aluminum alloy components rather than steel alloy components, also includes some functional elements that are implemented differently than is the preferred embodiment 101 of FIG. 1, specifically illustrating as has been mentioned that the watercraft of this invention is not dependent upon a specific component embodiment.

The frame 202 includes an aluminum center tube 210 that is somewhat thicker than the center tube 110 of the watercraft carrier 101 (in FIG. 1). The frame 202 additionally includes an aluminum round axle 206 that is attached to each end of the center tube 210. The axle 206 is formed along its length as an outer section 206a and an axially aligned inner section 206b, in which the wall formed between the outer and the inner sections 206a and 206b acts as an inner stop for the wheel assembly 103. A straight, short aluminum alloy pivot shaft 208, somewhat thicker than the down tube 108 of the watercraft carrier 101 (FIG. 1), is perpendicularly attached to the axle 206 at each end. There is a through hole 208a formed by drilling through the top portion of the pivot shaft 208 that in assembly removably accepts a wire pin (not shown) or other similar device for holding the cradle assembly 204 to the frame 202 when an in-assembly cradle assembly 204 and frame 202 are separated, such as when a secured watercraft is lifted. The pivot shafts are preferably held by the hooks 212d of the lateral straps 212, one lateral strap for throughhole 208a, so that each pivot shaft secures a lateral strap 212 to the watercraft carrier 201 while the hook 212d holds the cradle assembly 204 to the frame 202. The pivot shaft through hole 208a and pin or other device) therefore provide the functional equivalent of the snap 108a and snap enclosure 142 of the embodiment portrayed in FIG. 1. The pivot shaft 208 has a circular cross sectional shape to pivot within the pivot tube 222c.

The center tube 210 and the inner axles 206b comprise an outer cross sectional tube, and two closely fitting inner cross sectional cylinders that adjustably telescope into the center tube 210 from their respective ends. The center tube 210 and each inner axle 206b are separately connected by two respective collars 210a that are each attached to an end of the center tube 210 and adjustably attached to an individual inner axle 206b. Each inner axle 206b may be slid within the center tube 210 when its respective collar 210a is loosened on that inner axle 206b. By sliding an inner axle 206b within the center tube 210, the overall length of the frame 202 is adjusted and therefore the width of the cradle assembly 204.

The cradle assembly 204 has a pliant sheet 220 for supporting a transported watercraft, attached to an aluminum alloy cradle bar 222 at each cradle assembly 204 lateral side. Each cradle bar 222 is attached to a "V" shaped aluminum alloy tube 222a, forming together a triangular shaped structure. Each "V" shaped tube 222a is attached at each slanting stroke lower portion to a cross bracket 222b that braces the "V" shaped tube 222a. The cross bracket 222b is formed as a "⌴" shaped cross section that wraps around the tubes 222a such that the vertical strokes of the "⌴" are on either side of the tube 222a. The cross bracket 222b is made of a thicker aluminum than the "V" tube 222a, first allowing a better welding to a pivot tube 222c to be disclosed presently, than the "V" tube 222a, and second strengthening the bottom of the triangle where the side torque is the greatest.

A triangular support 222a is used to support the cradle bar 222, pliant sheet 220, and in-transport watercraft, rather than a single steel pivot shaft 124 (FIG. 1) that forms a "T" with cradle bar 122 that supports the watercraft. The farther the center of gravity of a supported weight moves from directly above a "T", and also the more a support structure is subject to lateral forces as when the watercraft carrier wheels impact a terrain obstruction, the more torque is applied to the vertical support of a watercraft carrier. Because the vertical support 222a of the watercraft carrier 201 comprises an aluminum alloy rather than a stronger steel alloy as in the watercraft carrier 101 of FIG. 1, the vertical support 222a is accordingly a triangular "V".

A pivot tube 222c is attached to each bracket 222b. The pivot tube 222c is a hollow cylindrical tube sized to slide over a pivot shaft 208 on the frame 202. In assembly, the pivot shafts 208 removably extend through the pivot tubes 222c, pivotally connecting the cradle assembly 204 to the frame 202.

The adjustment bars 228 are distanced from the cradle bars 222 by the thickness of each "V" tube 222a. This allows the plaint sheet 220 to rotate freely around the cradle bars 222, until the loop lateral junction 220b presses against the adjustment bars 228. The plaint sheet 220 width adjusts by threading one triangle of the of the "V" shaped tube 222a through the other, thus rolling the pliant sheet 220 around the cradle bar 222. Therefore, the void 120a of watercraft carrier 101 (FIG. 1) in the watercraft carrier 201 embodiment is unnecessary.

Figure 3:
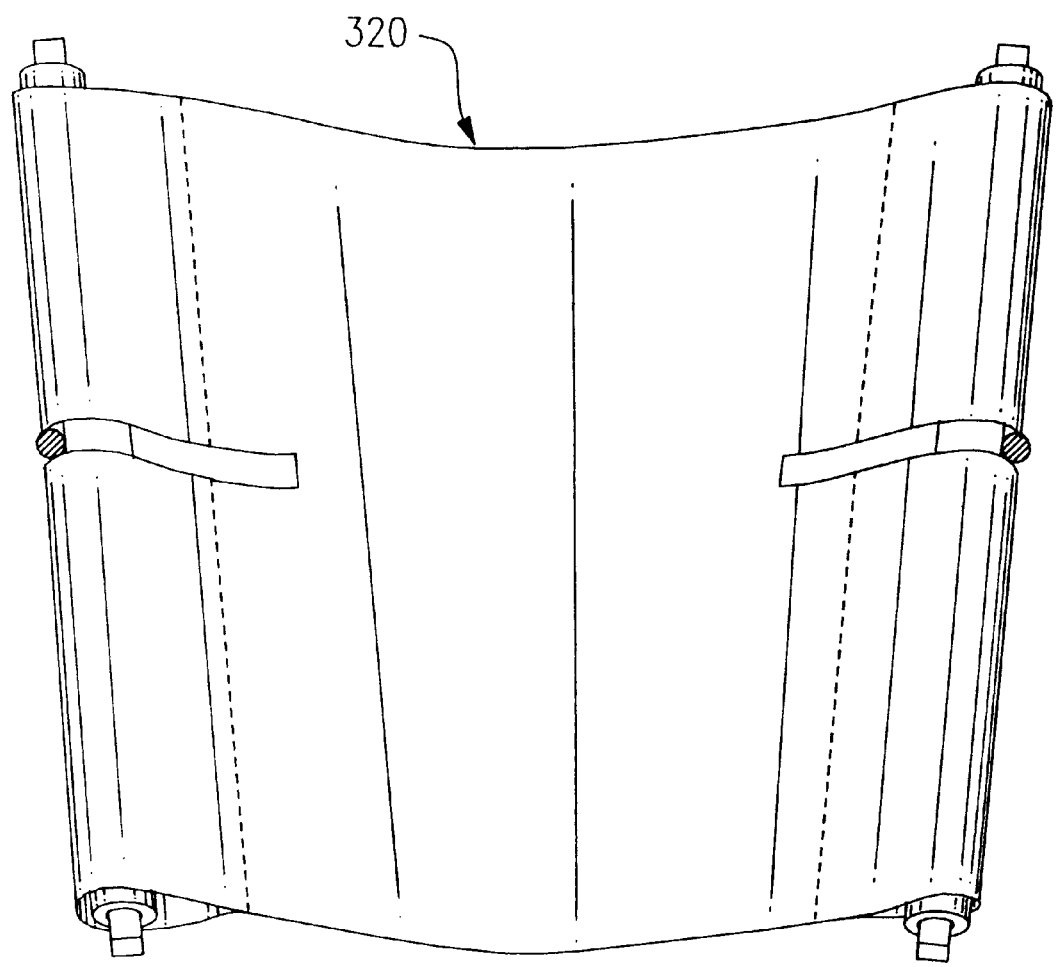
FIG. 3 portrays a top view of a pliant sheet having a progressively increasing width.

Referring to FIG. 3, The pliant sheet 320 may have a laterally increasing width. The preferred embodiment is a progressively increasing width forming a trapezoidal shaped pliant sheet 320. A laterally increasing width pliant sheet 320, with the wider section supporting the wider part of a tapered hull watercraft, minimizes the tilt of the carrier with respect to the gunwale. The angle of the trapezoidal pliant sheet 320 roughly matches the angle of wedge of the hull. This reduces the tilt of the watercraft carrier 101 (FIG. 1) embodiment in which the "T" design suspends a secured watercraft by cantilever. The farther the center of gravity moves from directly above the axle, the more stress on the "T". The trapezoidal shape approximates the normal watercraft angle of wedge, reducing the amount of forward or backward tilt possible.

Figure 4:
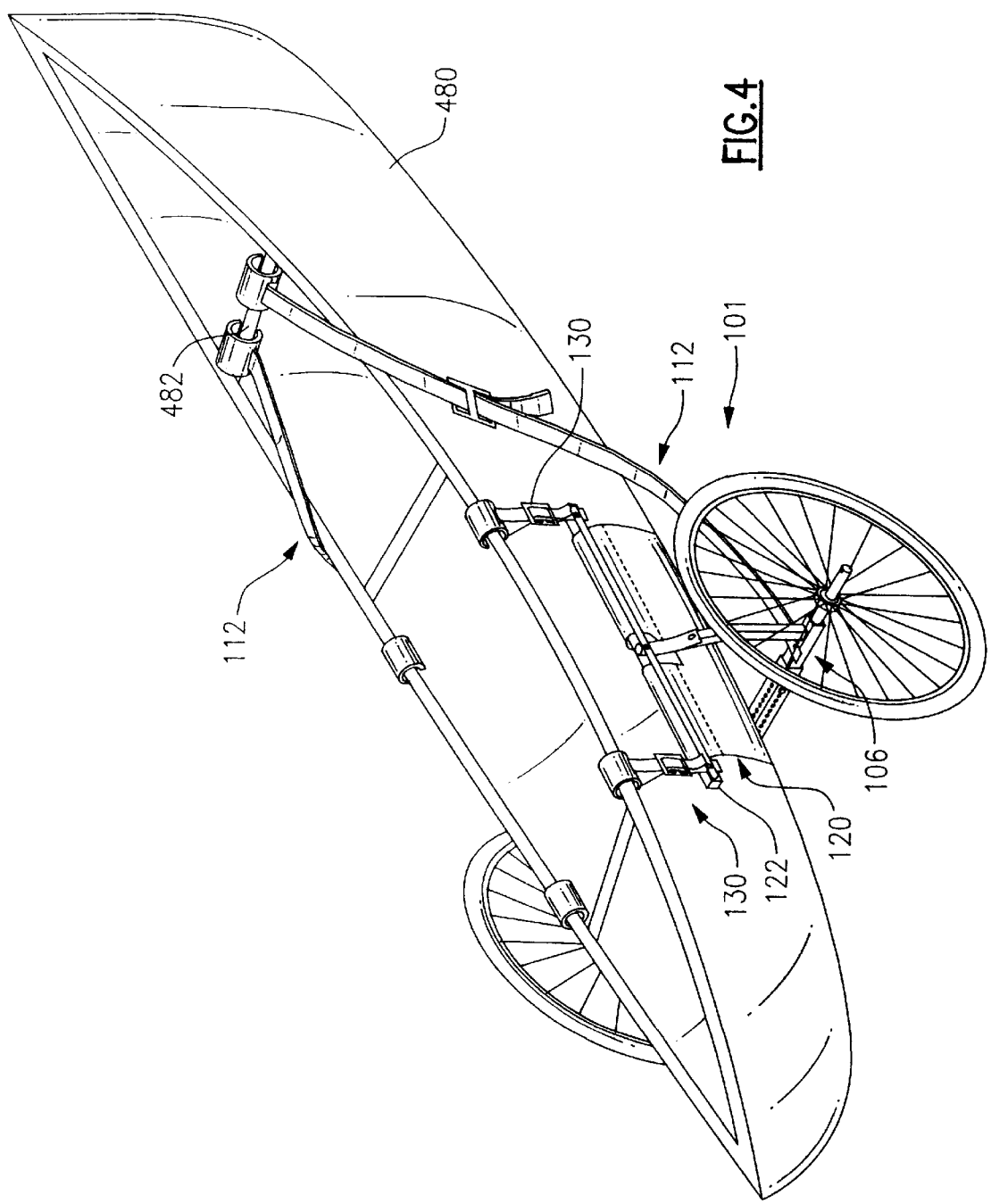
FIG. 4 portrays a top side perspective view of the watercraft carrier portrayed in FIG. 1 supporting and securing a watercraft.

Referring to FIG. 4, a watercraft 480 is placed onto the carrier 101 preferably about ⅓ from the back. The lateral straps 112 are removably fitted onto thwarts 482 of the watercraft 480. The pliant sheet 120 conforms to the watercraft hull, supporting the watercraft 480 vertically and horizontally during the lateral extent of the plaint sheet 120. The cradle bars 122 wedge the watercraft between them, securing the watercraft laterally and vertically, The gunwale straps 130 are removably fitted on the gunwales, with the gunwale straps 130 on each side of the cradle assembly being secured to that same side of the watercraft 480.

The bulk of the gear is placed in the watercraft 480 to the aft of the axle assemblies 106, until the watercraft 480 is balanced. The watercraft 480 can then be wheeled on a trail with relative ease. A bar or stick (not shown) strapped across the watercraft 480 makes it easy for two people to haul the watercraft 480 to its destination.

Referring again to FIG. 1, when it is desired to store or stow the carrier 101, the wheel assemblies 103 are removed from the frame 102. Likewise, the snap enclosures 142 are unsnapped, and the shape conforming cradle assembly 104 is separated from the frame 102 by pulling the pivot shafts 124 out of the down tubes 108.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A carrier for transporting a watercraft having a hull and at least two opposed gunwales, said carrier comprising:
    a frame having an axle;
    two wheels, each wheel being rotatably secured to said axle; and
    a hull cradle, said frame further including hull cradle supporting means for pivotally securing said hull cradle, said hull cradle having at least two opposed lateral supports for securing said watercraft, said lateral supports each being separately pivotal about said hull cradle supporting means adapted to conform to the angle of wedge of a hull of a corresponding watercraft fitted within said cradle, and in which said hull cradle supporting means are substantially centered relative to said lateral supports.

2. The combination recited in claim 1, wherein said carrier includes width adjusting means for adjustably defining the distance between said lateral supports.

3. The combination recited in claim 1, wherein said hull cradle further includes a shape conforming surface drooping between said lateral supports for supporting a hull of a watercraft with the load of the watercraft being evenly distributed over said shape conforming surface.

4. The combination recited in claim 3, wherein said shape conforming surface is formed from
    a shape conforming supple sheet for supporting said watercraft, said supple sheet being suspended from each lateral support, and sized to at least partially enclose said watercraft.

5. The combination recited in claim 4, wherein the width of said supple sheet is adjustable, whereby said supple sheet supports differing hull sizes and shapes.

6. The combination recited in claim 4, wherein said supple sheet is trapezoidal shaped, and said lateral supports are the non-parallel sides of said trapezoidal shape.

7. The combination recited in claim 4, wherein said carrier includes pliant sheet adjusting means for varying the width of said pliant sheet between said at least two lateral supports and for adjusting the amount of droop of said pliant sheet from the lateral supports.

8. The combination recited in claim 1, wherein said hull cradle defines a lateral support plane which includes each of said lateral supports and a supple sheet disposed therebetween, said lateral support plane being entirely disposed above the axle of said frame to accommodate a watercraft without interference therewith.

9. The combination recited in claim 1, wherein said hull cradle includes a pliant surface for increasing the contact area between said hull and said opposed lateral supports and for cushioning said watercraft and evenly distributing the load thereof.

10. The combination recited in claim 1, wherein said carrier includes at least two securing strap sets, each securing strap set having at least one securing strap;
    wherein each securing strap includes gunwale grasping means for temporarily attaching an end to a corresponding gunwale of said watercraft; and
    each securing strap set is connected to a distinct lateral support of said hull cradle;
    whereby each securing strap set temporarily attaches to an opposed gunwale of said watercraft and secures said opposed gunwale to said carrier.

11. The combination recited in claim 10, wherein each securing strap further includes length adjusting means for adjusting the length of said securing strap.

12. The combination recited in claim 1, wherein each of said wheels are detachably secured to said axle; and said hull cradle is detachably mounted on said cradle supporting means.

13. The combination recited in claim 1, wherein said carrier further includes at least one lateral strap set, each lateral strap set having at least one securing strap;
    wherein
    each securing strap includes watercraft grasping means for temporarily attaching an end to a said watercraft; and
    each lateral strap set is connected to said frame;
    whereby each lateral strap set temporarily laterally attaches to said watercraft and secures said watercraft laterally to said carrier.

14. The combination as recited in claim 13, wherein each securing strap further includes length adjusting means for adjusting the length of said strap.

15. A cradle assembly for securing and supporting a watercraft, said cradle assembly comprising:

a cradle including:

at least two opposed lateral cradle bars, each said cradle bar having a pivot point about which each said cradle bar separately pivots; and a pliant sheet secured between said at least two said opposed lateral cradle bars; said cradle assembly further including a frame for supporting said cradle, said frame including an axle for rotatably supporting a pair of wheels, wherein said cradle is disposed entirely above said axle for allowing the load of a watercraft to be generally and evenly distributed by said cradle, and in which said cradle bars separately pivot to allow the cradle to conform to the angle of wedge of a corresponding hull of a watercraft.

16. The combination recited in claim 15, wherein said cradle assembly includes width adjusting means for adjusting the separation between said opposed cradle bars.

17. The combination recited in claim 15, wherein said pliant sheet is secured by at least two opposed cradle bars.

18. The combination recited in claim 17, wherein said pliant sheet has two opposed ends that are each continuously secured by at least two said cradle bars.

19. The combination recited in claim 15, wherein said cradle assembly includes pliant sheet adjusting means for varying the width of said pliant sheet between said at least two said cradle bars and in which the droop of said pliant sheet is adjusted.

20. The combination recited in claim 19, wherein said pliant sheet adjusting means includes means for rolling said pliant sheet around at least one said cradle bar.

21. The combination recited in claim 15, wherein said pliant sheet has a laterally increasing width.

22. The combination recited in claim 15, wherein said cradle assembly includes at least two securing straps for separately securing ends of two straps on a gunwale of a said watercraft.

23. The combination recited in claim 15, wherein said frame includes frame width adjusting means for adjusting the width of said frame.

24. The combination recited in claim 15, wherein each of said pivot points are substantially centered relative to the lateral cradle bars.

* * * * *